United States Patent
Nevitt et al.

(12) 
(10) Patent No.: US 6,268,961 B1
(45) Date of Patent: Jul. 31, 2001

(54) OPTICAL FILMS HAVING AT LEAST ONE PARTICLE-CONTAINING LAYER

(75) Inventors: Timothy J. Nevitt, Redwing; Carl A. Stover, St. Paul; William L. Kausch, Cottage Grove; Guy M. Kallman, St. Paul; Robert W. Horn, Woodbury; Timothy J. Hebrink, Oakdale; James A. Olson, Maplewood; Mark B. O'Neill, New Brighton; Elisa M. Cross, Woodbury; Susan L. Kent, Shorewood, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/498,028

(22) Filed: Feb. 4, 2000

Related U.S. Application Data

(63) Continuation-in-part of application No. 09/399,531, filed on Sep. 20, 1999, now abandoned.

(51) Int. Cl.[7] .................................................. G02B 27/28

(52) U.S. Cl. ........................ 359/488; 359/487; 359/494; 359/498; 359/500; 359/599; 359/900; 349/84; 349/96

(58) Field of Search ............................ 359/483, 485, 359/487, 488, 494, 495, 497, 498, 500, 599, 900; 349/84, 96; 264/1.31, 1.34

(56) References Cited

U.S. PATENT DOCUMENTS

| 540,768 | 6/1895 | Western . |
| 3,124,639 | 3/1964 | Kahn ........................................ 88/65 |
| 3,610,729 | 10/1971 | Rogers ................................. 350/157 |
| 3,711,176 | 1/1973 | Alfrey, Jr. et al. ...................... 350/1 |
| 3,860,036 | 1/1975 | Newman, Jr. .......................... 138/45 |
| 4,268,127 | 5/1981 | Oshima et al. ....................... 359/488 |

(List continued on next page.)

FOREIGN PATENT DOCUMENTS

| 0 940 705 | 9/1999 | (EP) . |
| 6-123802 | 5/1994 | (JP) . |
| 06258522 | 9/1994 | (JP) . |
| 10240143 | 9/1998 | (JP) . |
| WO 94/11766 | 5/1994 | (WO) . |
| WO 95/27919 | 4/1995 | (WO) ............................. G02B/27/28 |
| WO 95/17303 | 6/1995 | (WO) ............................. B23B/7/02 |
| WO 95/17691 | 6/1995 | (WO) ............................. G02B/5/30 |
| WO 95/17692 | 6/1995 | (WO) ............................. G02B/5/30 |

(List continued on next page.)

OTHER PUBLICATIONS

Schrenk et al., Nanolayer polymeric optical films, Tappi Journal, pp. 169–174, Jun., 1992.

Article: Wortman, David L., "A Recent Advance in Reflective Polarizer Technology," 3M Optical Systems Department, Sep. 15, 1997, pp. 98–106.

*Primary Examiner*—Cassandra Spyrou
*Assistant Examiner*—John Juba, Jr.
(74) *Attorney, Agent, or Firm*—John A. Burtis

(57) ABSTRACT

An optical film includes a reflective polarizing element and a particle-containing layer. The reflective polarizing element substantially reflects light having a first polarization state and substantially transmits a second polarization state. The particle-containing layer is disposed on the reflective polarizing element and in a same optical path as the reflective polarizing element. The particle-containing layer is configured and arranged to transmit light and includes a plurality of particles that roughen an exterior surface of the optical film. Preferably, using the optical film in an optical device does not substantially reduce the gain advantage of the optical device when compared with an optical device utilizing the same optical film without particles in the surface layer. Also described are optical devices using the optical film and methods of making and using the optical films.

40 Claims, 7 Drawing Sheets

U.S. PATENT DOCUMENTS

| | | | |
|---|---|---|---|
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,720,426 | 1/1988 | Englert et al. | 428/344 |
| 5,188,760 | 2/1993 | Hikmet et al. | 252/299.01 |
| 5,211,878 | 5/1993 | Reiffenrath et al. | 252/299.63 |
| 5,235,443 | 8/1993 | Barnik et al. | 359/37 |
| 5,269,995 | 12/1993 | Ramantahan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,389,324 | 2/1995 | Lewis et al. | 264/171 |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,506,704 | 4/1996 | Broer et al. | 359/63 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,691,789 | 11/1997 | Li et al. | 349/98 |
| 5,699,188 | 12/1997 | Gilbert et al. | 359/584 |
| 5,706,134 | 1/1998 | Konno et al. | 359/599 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,756,633 | 5/1998 | Larson | 528/28 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,815,313 | 9/1998 | Mitani et al. | 359/448 |
| 5,825,542 | 10/1998 | Cobb Jr. et al. | 359/487 |
| 5,825,543 | 10/1998 | Ouderkirk et al. | 359/494 |
| 5,856,855 | 1/1999 | Mol et al. | 349/65 |
| 5,867,316 | 2/1999 | Carlson et al. | 359/500 |
| 5,882,774 | 3/1999 | Jonza et al. | 428/212 |
| 5,932,342 | 8/1999 | Zeira et al. | 359/599 |
| 5,940,149 | 8/1999 | Vanderwerf | 349/5 |
| 5,962,114 | 10/1999 | Jonza et al. | 428/212 |
| 5,965,247 | 10/1999 | Jonza et al. | 428/212 |
| 5,976,686 | 11/1999 | Kaytor et al. | 359/599 |
| 5,991,077 | 11/1999 | Carlson et al. | 359/500 |
| 6,002,460 | 12/1999 | Yamamoto | 349/96 |
| 6,002,464 | 12/1999 | Fujisawa et al. | 359/599 |
| 6,008,940 | 12/1999 | Michihata et al. | 359/483 |
| 6,018,419 | 1/2000 | Cobb Jr. et al. | 359/599 |
| 6,081,376 | 6/2000 | Hansen et al. | 359/483 |
| 6,104,455 | 8/2000 | Kashima | 359/487 |
| 6,111,699 | 8/2000 | Iwata et al. | 359/599 |
| 6,124,971 | 9/2000 | Ouderkirk et al. | 359/487 |

FOREIGN PATENT DOCUMENTS

| | | | |
|---|---|---|---|
| WO 95/17699 | 6/1995 | (WO) | G02F/1/1335 |
| WO 96/19347 | 6/1996 | (WO) | B23B/7/02 |
| WO 97/01440 | 1/1997 | (WO) | B32B/27/36 |
| WO 97/01774 | 1/1997 | (WO) | G02B/1/10 |
| WO 99/36248 | 7/1999 | (WO) | B29C/47/70 |
| WO 99/36258 | 7/1999 | (WO) | B32B/7/02 |
| WO 99/36262 | 7/1999 | (WO) | B23B/27/00 |
| WO 99/36813 | 7/1999 | (WO) | G02B/5/30 |
| WO 99/36814 | 7/1999 | (WO) | G02B/5/30 |

OPTICAL FILMS HAVING AT LEAST ONE PARTICLE-CONTAINING LAYER

This is a continuation-in-part application of U.S. patent application Ser. No. 09/399,531, filed Sept. 20, 1999, and now abandoned, the contents of which is incorporated herein by reference.

FIELD OF THE INVENTION

This invention relates to optical films, devices containing the optical films, and methods of using and making the optical films. The invention also relates to optical films having at least one particle-containing layer, devices containing the optical films, and methods of using and making the optical films.

BACKGROUND OF THE INVENTION

Polymeric films are used in a wide variety of applications. One particular use of polymeric films is in reflective polarizers which reflect light of one polarization for a given wavelength range and substantially pass light of the orthogonal polarization. Such reflective polarizers are used, for example, in conjunction with backlights in liquid crystal displays to enhance brightness of the display. For example, a reflective polarizer can be placed between a backlight and a liquid crystal display panel. This arrangement permits light of one polarization to pass through to the display panel and light of the other polarization to recycle through the backlight or to reflect off a reflective surface positioned behind the backlight, giving the light an opportunity to depolarize and pass through the reflective polarizer.

One example of a polarizer includes a stack of polymer layers of differing composition. One configuration of this stack of layers includes a first set of birefringent layers and a second set of layers with an isotropic index of refraction. The second set of layers alternates with the birefringent layers to form a series of interfaces for reflecting light. Another type of reflective polarizer includes continuous/disperse phase reflective polarizers that have a first material dispersed within a continuous second material that has an index of refraction for one polarization of light that is different than the corresponding index of the first material. Other types of reflective polarizer include wire grid polarizers and polarizers formed using birefringent cholesteric materials.

SUMMARY OF THE INVENTION

Generally, the present invention relates to optical films, devices containing the optical films, and methods of using and making the optical films. The invention also relates to optical films having at least one particle-containing layer, devices containing the optical films, and methods of using and making the optical films.

One embodiment is an optical film including a reflective polarizing element and a surface layer. The reflective polarizing element substantially reflects light having a first polarization state and substantially transmits a second polarization state. The surface layer is disposed on the reflective polarizing element and in a same optical path as the reflective polarizing element. The surface layer is configured and arranged to transmit light and includes a plurality of particles that roughen an exterior surface of the surface layer. Preferably, using the optical film in an optical device does not substantially reduce the gain advantage of the optical device when compared with an optical device utilizing the same optical film without particles in the surface layer.

The surface layer can be disposed on the reflective polarizing element by a variety of methods including, for example, coating or otherwise depositing the surface layer after forming the reflective polarizing element. Alternatively, the reflective polarizing element and surface layer can be formed together (e.g., coextruded). Substantially all or only a portion of the particles in the surface layer can be exposed or projecting from the surface layer. In at least some instances, substantially all of the particles can be embedded within the surface layer while still roughening an exterior surface of the surface layer.

Another embodiment is an optical device containing the optical film. The optical device also includes at least a light source or display medium (e.g., a liquid crystal display medium). In at least some optical devices, the reflective polarizing element and surface layer are disposed between a light source and a display medium and, in at least some of these devices, the surface layer is positioned between the reflective polarizing element and the display medium.

Yet another embodiment is a method of making the optical film described above. The reflective polarizing element is formed to substantially reflect light having a first polarization state and substantially transmit light having a second polarization state. The surface layer is formed on a first major surface of the reflective polarizing element. The surface layer includes particles that roughen an exterior surface of the surface layer.

A further embodiment of the invention is an optical film including a reflective polarizing element and a particle containing layer disposed on the reflective polarizing element. The reflective polarizing element substantially reflects light having a first polarization state and substantially transmits light having a second polarization state. The particle containing layer is disposed in the same optical path as the reflective polarizing element and is configured and arranged to transmit light. The particle-containing layer includes a plurality of particles that roughen an exterior surface of the optical film. The particle-containing layer can be a surface layer of the optical film or a cover layer can be disposed over the particle-containing layer with the particle-containing layer roughening the exterior surface of the cover layer.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
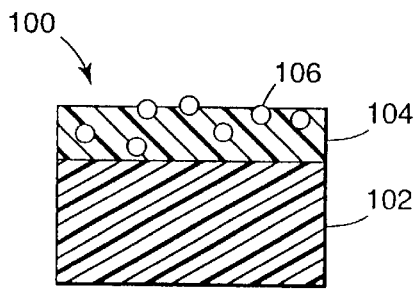
FIG. 1 is a schematic cross-sectional view of one embodiment of an optical film according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical films, devices containing the optical films, and methods of making and using the optical films. The present invention is also directed to optical films having at least one particle-containing layer, devices containing the optical films, and methods of making and using the optical films. While the present invention is not so limited, an appreciation of various aspects of the invention will be gained through a discussion of the examples provided below.

As used in connection with the present invention, "luminance gain" refers to the ratio (a:b) of (a) the luminance of a backlight or display over a desired wavelength range at a particular viewing angle (with respect to a normal axis) with an optical film containing a reflective polarizer, to (b) the luminance of the same backlight or display over the desired wavelength range at the particular viewing angle (with respect to a normal axis) alone, i.e., without an optical film containing a reflective polarizer.

"Normal angle gain" refers to luminance gain at a viewing angle of 90 degrees relative to the plane (e.g., surface) of the optical film.

"Gain advantage" refers to the normal angle gain minus 1 (corresponding to a film that does not polarize light).

FIG. 1 illustrates an optical film 100 including a reflective polarizing element 102 and at least one layer 104 containing particles 106. Particle-containing layer(s) can be disposed, for example, on a major surface of the reflective polarizing element, within the reflective polarizing element, or both on a major surface of and within the reflective polarizing element. Each particle-containing layer can be, for example, a layer coated onto the reflective polarizing element or a layer (e.g., a skin layer or interior non-optical layer) formed together (e.g., co-extended) with the reflective polarizing element.

Reflective Polarizing Elements

A variety of reflective polarizing elements can be used in the optical films. Typically, the reflective polarizing elements transmit light of one polarization state and reflect light of a different polarization state. The materials and structures used to accomplish these functions can vary. Depending on the materials and structure of the optical film, the term "polarization state" can refer to, for example, linear, circular, and elliptical polarization states.

Examples of suitable reflective polarizing elements include multilayer reflective polarizers, continuous/disperse phase reflective polarizers, cholesteric reflective polarizers (which are optionally combined with a quarter wave plate), and wire grid polarizers. In general, multilayer reflective polarizers and cholesteric reflective polarizers are specular reflectors and continuous/disperse phase reflective polarizers are diffuse reflectors, although these characterizations are not universal (see, e.g., the diffuse multilayer reflective polarizers described in U.S. Pat. No. 5,867,316). This list of illustrative reflective polarizing elements is not meant to be an exhaustive list of suitable reflective polarizing elements. Any reflective polarizer that preferentially transmits light having one polarization and preferentially reflects light having a second polarization can be used.

Both multilayer reflective polarizers and continuous/disperse phase reflective polarizers rely on index of refraction differences between at least two different materials (preferably polymers) to selectively reflect light of one polarization orientation while transmitting light with an orthogonal polarization orientation. Suitable diffuse reflective polarizers include the continuous/disperse phase reflective polarizers described in U.S. Pat. No. 5,825,543, incorporated herein by reference, as well as the diffusely reflecting multilayer polarizers described in U.S. Pat. No. 5,867,316, incorporated herein by reference. Other reflective polarizing elements are described in U.S. Pat. No. 5,751,388, incorporated herein by reference.

Cholesteric reflective polarizers are described in, e.g., U.S. Pat. No. 5,793,456, U.S. Pat. No. 5,506,704, and U.S. Pat. No. 5,691,789, all of which are incorporated herein by reference. One cholesteric reflective polarizer is marketed under the trademark TRANSMAX™ by E. Merck & Co. Wire grid polarizers are described in, for example, PCT Publication WO 94/11766, incorporated herein by reference.

Illustrative multilayer reflective polarizers are described in, for example, PCT Publication Nos. WO95/17303; WO95/17691; WO95/17692; WO95/17699; WO96/19347; and WO99/36262, all of which are incorporated herein by reference. One commercially available form of a multilayer reflective polarizer is marketed as Dual Brightness Enhanced Film (DBEF) by 3M, St. Paul, Minn. Multilayer reflective polarizers are used herein as an example to illustrate optical film structures and methods of making and using the optical films of the invention. The structures, methods, and techniques described herein can be adapted and applied to other types of suitable reflective polarizing elements.

Figure 2:
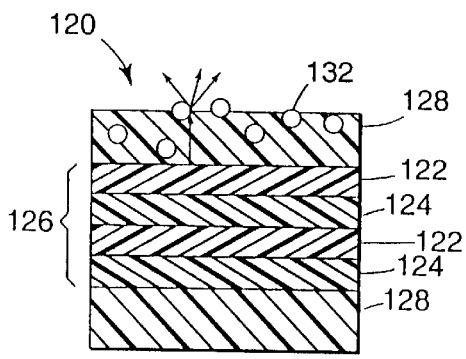
FIG. 2 is a schematic cross-sectional view of a second embodiment of an optical film according to the invention.

A suitable multilayer reflective polarizer for an optical film 120 can be made by alternating (e.g., interleaving) uniaxially- or biaxially-oriented birefringent first optical layers 122 with second optical layers 124, as illustrated in FIG. 2. In some embodiments, the second optical layers 124 have an isotropic index of refraction that is approximately equal to one of the in-plane indices of the oriented layer. Alternatively, both optical layers 122, 124 are formed from birefringent polymers and are oriented so that the indices of refraction in a single in-plane direction are approximately equal. Whether the second optical layers are isotropic or birefringent, the interface between the two optical layers 122,124 forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers 122, 124.

Typically, the highest reflectivity for a particular interface occurs at a wavelength corresponding to twice the combined optical thickness of the pair of optical layers 122, 124 which form the interface. The optical thickness describes the difference in path length between light rays reflected from the lower and upper surfaces of the pair of optical layers. For light incident at 90 degrees to the plane of the optical film (normally incident light), the optical thickness of the two layers is $n_1 d_1 + n_2 d_2$ where $n_1$, $n_2$ are the indices of refraction of the two layers and $d_1$, $d_2$ are the thicknesses of the corresponding layers. This equation can be used to tune the optical layers for normally incident light using only a single out-of-plane (e.g., $n_z$) index of refraction for each layer. At other angles, the optical distance depends on the distance traveled through the layers (which is larger than the thickness of the layers) and the indices of refraction in at least two of the three optical axes of the layer. Typically, the transmission of light incident on the optical film at an angle less than 90 degrees with respect to the plane of the film produces a spectrum with a bandedge that is shifted to a lower wavelength (e.g., blue-shifted) relative to the bandedge observed for transmission of normally incident light.

With respect to normally incident light, the layers 122, 124 can each be a quarter wavelength thick or the layers 122, 124 can have different optical thicknesses, so long as the sum of the optical thicknesses is half of a wavelength (or a multiple thereof). A film having a plurality of layers can include layers with different optical thicknesses to increase the reflectivity of the film over a range of wavelengths. For example, a film can include pairs of layers which are individually tuned (for normally incident light, for example) to achieve optimal reflection of light having particular wavelengths.

Figure 3:
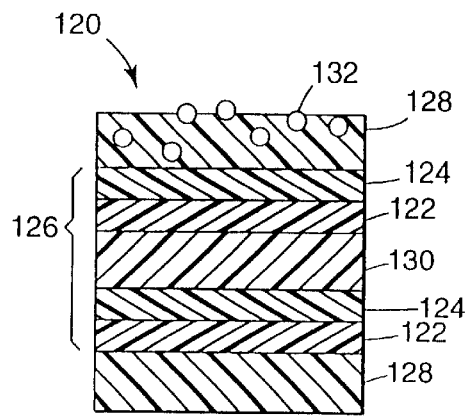
FIG. 3 is a schematic cross-sectional view of a third embodiment of an optical film according to the invention.
Figure 4:
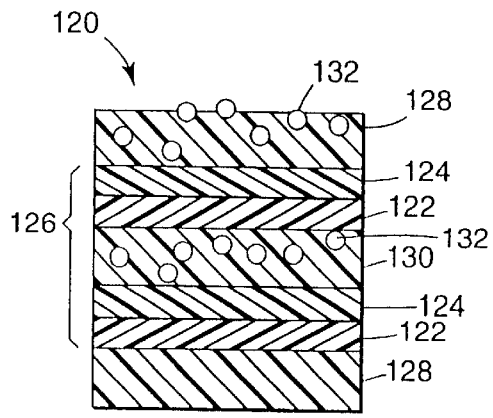
FIG. 4 is a schematic cross-sectional view of a fourth embodiment of an optical film according to the invention.
Figure 5:
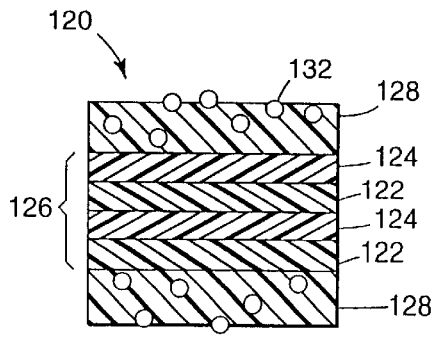
FIG. 5 is a schematic cross-sectional view of a fifth embodiment of an optical film according to the invention.

In addition to the first and second optical layers 122, 124, the multilayer reflective polarizer 120 optionally includes one or more non-optical layers such as, for example, one or more skin layers 128 or one or more interior non-optical layers 130, as illustrated in FIGS. 2 and 3. Additional sets of optical layers, similar to the first and second optical layers 122, 124 can also be used in a multilayer reflective polarizer. The design principles disclosed herein for the sets of first and second optical layers can be applied to any additional sets of optical layers. Furthermore, it will be appreciated that, although only a single multilayer stack 126 is illustrated in FIGS. 2 and 3, the multilayer reflective polarizer can be made from multiple stacks that are subsequently combined to form the film.

Furthermore, although FIGS. 2 and 3 show only four optical layers 122, 124, multilayer reflective polarizers 120 can have a large number of optical layers. Generally, multilayer reflective polarizers have about 2 to 5000 optical layers, typically about 25 to 2000 optical layers, and often about 50 to 1500 optical layers or about 75 to 1000 optical layers.

First and Second Optical Layers

The first optical layers are preferably birefringent polymer layers that are uniaxially- or biaxially-oriented. The second optical layers can be polymer layers that are birefringent and uniaxially- or biaxially-oriented or the second optical layers can have an isotropic index of refraction which is different from at least one of the indices of refraction of the first optical layers after orientation.

The first and second optical layers are generally no more than 1 µm thick and typically no more than 400 nm thick, although thicker layers can be used, if desired. These optical layers can have the same or different thicknesses.

The first and second optical layers and the optional non-optical layers of a multilayer reflective polarizer are typically composed of polymers such as, for example, polyesters. Other types of reflective polarizing elements (e.g., continuous/disperse phase reflective polarizers, cholesteric polarizers, and wire grid polarizers) can be formed using the materials described in the references cited above.

Polyesters for use in multilayer reflective polarizers generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The term "polymer" will be understood to include both polymers and copolymers, as well as polymers or copolymers which may be formed in a miscible blend, for example, by coextrusion or by reaction, including, for example, transesterification. The terms "polymer", "copolymer", and "copolyester" include both random and block copolymers. Also included within the term "polyester" are polycarbonates which are derived from the reaction of glycol monomer molecules with esters of carbonic acid.

The properties of a polymer layer or film vary with the particular choice of monomer molecules. One example of a polyester useful in multilayer reflective polarizers is polyethylene naphthalate (PEN) which can be made, for example, by reaction of naphthalene dicarboxylic acid with ethylene glycol.

Suitable carboxylate monomer molecules for use in forming the carboxylate subunits of the polyester layers include, for example, 2,6-naphthalene dicarboxylic acid and isomers thereof, terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Suitable glycol monomer molecules for use in forming glycol subunits of the polyester layers include ethylene glycol; propylene glycol; 1,4-butanediol and isomers thereof, 1,6-hexanediol; neopentyl glycol; polyethylene glycol; diethylene glycol; tricyclodecanediol; 1,4-cyclohexanedimethanol and isomers thereof, norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Non-polyester polymers are also useful in creating polarizer films. For example, polyether imides can be used with polyesters, such as PEN and coPEN, to generate a multilayer reflective polarizer. Other polyester/non-polyester combinations, such as polyethylene terephthalate and polyethylene (e.g., Engage™ 8200, Dow Chemical Corp., Midland, Mich.), can be used.

The first optical layers are typically orientable polymer films, such as polyester films, which can be made birefringent by, for example, stretching the first optical layers in a desired direction or directions. The term "birefringent" means that the indices of refraction in orthogonal x, y, and z directions are not all the same. For films or layers in a film, a convenient choice of x, y, and z axes includes the x and y axes corresponding to the length and width of the film or layer and the z axis corresponding to the thickness of the layer or film.

The first optical layers, can be uniaxially-oriented, for example, by stretching in a single direction. A second orthogonal direction can be allowed to neck (e.g., decrease in dimension) into some value less than its original length. In one embodiment, the direction of stretching substantially corresponds to either the x or y axis. However, other directions can be chosen. A birefringent, uniaxially-oriented layer typically exhibits a difference between the transmission or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction depends on factors such as, for example, the amount of stretching, the stretch rate, the temperature of the film during stretching, the thickness of the film, the thickness of the individual layers, and the composition of the film. Typically, the first optical layers 122 have an in-plane birefringence (the absolute value of $n_x-n_y$) after orientation of 0.04 or greater at 632.8 nm, preferably about 0.1 or greater, and more preferably about 0.2 or greater. All birefringence and index of refraction values are reported for 632.8 nm light unless otherwise indicated.

The second optical layers 124 can be made from a variety of polymers. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates. The second optical layers will be exemplified below by copolymers of polyesters, however, it will be understood that the other polymers described above may also be used. The same considerations with respect to optical properties for the copolyesters, as described below, will also typically be applicable for the other polymers and copolymers.

In some embodiments, the second optical layers are uniaxially or biaxially orientable. In other embodiments, the second optical layers are not oriented under the processing conditions used to orient the first optical layers. These second optical layers substantially retain a relatively isotropic index of refraction, even when stretched or otherwise oriented. For example, the second optical layers can have a birefringence of about 0.06 or less, or about 0.04 or less, at 632.8 nm. Examples of suitable materials for the second optical layers are copolymers of PEN, PBN, PET, or PBT.

Non-Optical Layers

Non-optical layers can be used in multilayer reflective polarizers to, for example, give the polarizer structure or protect the polarizer from harm or damage during or after processing. Non-optical layers include skin layers 128 disposed to form a major surface of the multilayer reflective polarizer (see FIG. 2) and interior non-optical layers 130 disposed between packets of optical layers 122, 124 (see FIG. 3). Additional coatings may also be considered non-optical layers. The non-optical layers typically do not substantially affect the polarizing properties of the optical films over the wavelength region of interest (e.g., visible light). Suitable polymer materials for the non-optical layers of multilayer reflective polarizers (and other reflective polarizing elements) can be the same as those used for the first or second optical layers.

The skin layers and optional non-optical layers can be thicker than, thinner than, or the same thickness as the first and second optical layers. The thickness of the skin layers and optional non-optical layers is generally at least four times, typically at least 10 times, and can be at least 100 times, the thickness of at least one of the individual first and second optical layers. The thickness of the non-optical layers can be varied to make a multilayer reflective polarizer having a particular thickness. Typically, one or more of the non-optical layers are placed so that at least a portion of the light to be transmitted, polarized, or reflected by the first and second optical layers also travels through these layers (i.e., these layers are placed in the path of light which travels through or is reflected by the first and second optical layers).

Preferably, the polymers of the first optical layers, the second optical layers, and the optional non-optical layers are chosen to have similar rheological properties (e.g., melt viscosities) so that they can be co-extruded without flow disturbances. Typically, the second optical layers, skin layers, and optional non-optical layers have a glass transition temperature, $T_g$, that is either below or no greater than about 40° C. above the glass transition temperature of the first optical layers. Preferably, the glass transition temperature of the second optical layers, skin layers, and optional non-optical layers is below the glass transition temperature of the first optical layers.

Conventional Optical Films

Conventional optical films can include a polymeric optical film incorporating a reflective polarizing element such as those described in the references cited above. It has been found that these polymeric optical films often wet-out or adhere to adjacent surfaces in, for example, a liquid crystal display that is made of smooth glass. This may result in the formation of bright spots since two air-polymer interfaces are removed and transmission is increased. In addition, polymeric optical films can display Newton's rings, which are rings of color seen because of interference between two closely spaced surfaces. Both of these phenomena affect the optical properties of the polymeric optical film and the devices in which the film is disposed.

Moreover, small point defects in the optical film are a concern to users. These defects can be aesthetically unappealing or hinder inspection and repair activities. Also, other non-smooth films and elements in a device such as a display can imprint the optical film, leaving an unsatisfactory surface to the film. Furthermore, under temperature cycling, polymeric optical films can exhibit warping (e.g., the film buckles and temporarily or permanently takes a non-flat shape). In addition, when used in displays (e.g., liquid crystal displays), the optical films can exhibit a colorful appearance when viewed at viewing angles substantially different than normal (i.e., light incident at 90° with respect to the plane of the optical film), and these colors can vary spatially across the display. This color non-uniformity is caused, at least in part, by non-uniform pass-state spectra for wide viewing angles of incidence (e.g., 50 degrees or less relative to the plane of the optical film).

Attempts have been made in previous optical films to address at least some of these issues. For example, embossing of the outermost layers (e.g., skin layers) has been used to reduce wet-out and the formation of Newton's rings. However, embossing can provide a much less uniform surface appearance. At least in some instances, the embossed texture can be viewed by a user at high incidence angles. In addition, embossing requires a precision embossing tool and additional steps in the production of the optical film. Embossing may also detrimentally affect the layer caliper uniformity resulting in color non-uniformity.

Particle-Containing Layers

It has been found that the addition of particles in a particle-containing layer, which is in the optical path of light being polarized by the reflective polarizing element, provides some advantageous optical or mechanical properties. These advantages include, for example, reduction or elimination of wetting out and Newton's rings and color hiding or averaging.

Figure 6:
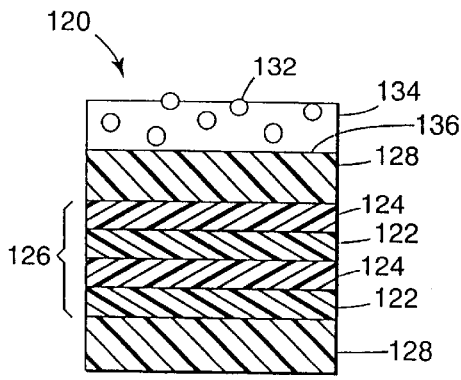
FIG. 6 is a schematic cross-sectional view of a sixth embodiment of an optical film according to the invention.
Figure 7:
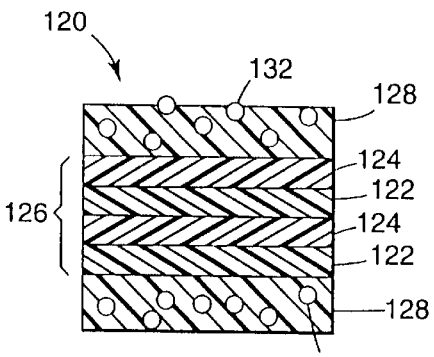
FIG. 7 is a schematic cross-sectional view of a seventh embodiment of an optical film according to the invention.

As illustrated in FIGS. 2 to 7 for the case of a multilayer reflective polarizer, the layer(s) containing particles 132 can be, for example, one of the skin layers 128 (FIGS. 2, 3, and 4), both skin layers 128 (FIG. 5 and 7), or a coating 134 disposed on a major surface 136 of the reflective polarizing element (FIG. 6). A portion of or even all of the particles can project from the layer. The examples shown in FIGS. 2 to 7 can be modified for use with other reflective polarizing elements, such as, for example, continuous/disperse phase reflective polarizers, cholesteric reflective polarizers, and wire grid reflective polarizers. The particle-containing layer(s) can be individually a skin layer of the reflective polarizing element, an interior non-optical layer within the reflective polarizing element, or a coating on the reflective polarizing element.

Figure 10:
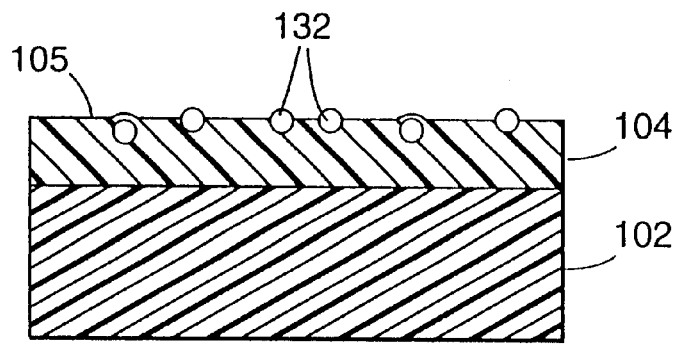
FIG. 10 is a schematic cross-sectional view of an eighth embodiment of an optical film according to the invention.
Figure 11:
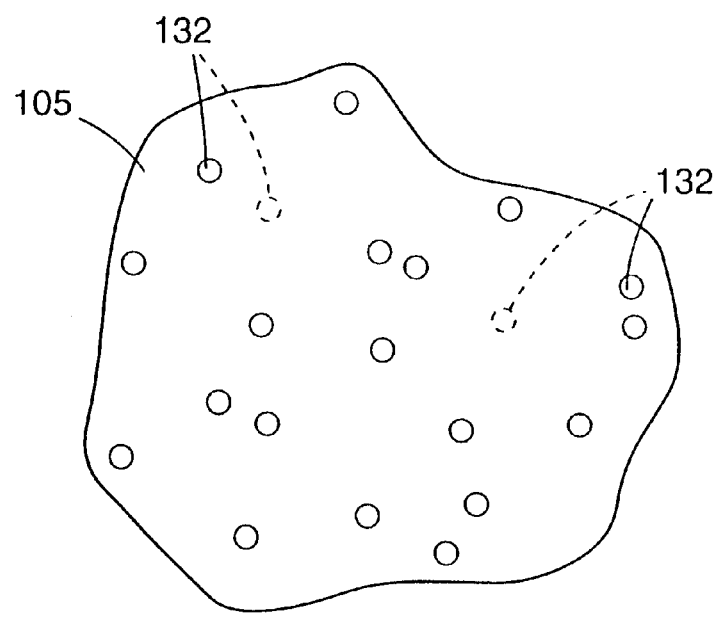
FIG. 11 is a top view of the optical film of FIG. 10.

FIGS. 10 and 11 illustrate another embodiment of the invention in which a monolayer of particles 132 is located at the surface 105 of layer 104 on a reflective polarizing element 102 to provide a surface layer coating on the reflective polarizing element. For the purposes of the present invention, a "monolayer" is a layer with a thickness of about one particle 132 that is located at or near the surface 105 of layer 104.

In some instances, some of the particles 132 are embedded in layer 104, with the remaining particles 132 projecting from and, optionally, partially exposed outside of layer 104. In other instances, substantially all of the particles 132 can be completely encased or embedded within layer 104, yet still provide a roughened surface.

The particles 132 in a surface layer on a reflective polarizing element 102 can be characterized based on the percent to which they occupy the surface of the layer 104. To achieve the desired properties of reducing color exhibited by a reflecting polarizing element and reducing wet-out, it may be desired that the particles 132 occupy at least about 10% of the exposed surface of layer 104. It may further be desired that the particles 132 occupy at least about 20% of the exposed surface area of layer 104.

Increasing the amount of exposed surface area of layer 104 that is occupied by the particles 132 may provide additional advantages in luminance gain of, for example, a backlight or optical display including a reflective polarizing element 102 with particles 132 in a layer 104. Where luminance gain is to be increased, however, the surface including particles 132 preferably faces away from the light source and the particles 132 preferably occupy at least a majority or more (i.e., greater than 50%) of the exposed surface area of layer 104, more preferably about 60% or more, still more preferably about 70% or more, and even more preferably about 90% or more.

As demonstrated in the examples, monolayer or other distributions of particles in a surface layer on a reflective polarizing element can increase luminance gain at the normal axis and for relatively wide viewing angles from normal, e.g., in some instances at least about ±30 degrees from normal. In addition, monolayer and other diffusing element distributions can also reduce or eliminate visible off-axis color non-uniformities for multilayer optical film reflective polarizers. Preferably, the gain advantage using an optical film with a particle-containing layer is not substantially reduced as compared to the same optical film without particles. Preferably, the gain advantage is reduced by no more than 5%, more preferably, no more than 3%, and even more preferably, no more than 2% for a wavelength (e.g., 632.8 nm) or wavelength range of interest.

Preferably, the particles do not substantially absorb or depolarize light transmitted by the reflective polarizing element. Preferably, the amount of light transmitted through the optical film is not substantially reduced. More preferably the amount of light having the polarization preferentially transmitted by the reflective polarizing element is not substantially reduced, as determined using, for example, a second polarizer.

A roughened surface can prevent or reduce wetting-out of the optical film on other adjacent substrates or films because the texture of the roughened surface prevents or reduces the ability of the optical film to adhere to an adjacent smooth surface. A roughened surface can also prevent or reduce the severity of Newton's rings (e.g., rings of color due to interference between two closely spaced smooth surfaces). The texture of the roughened surface reduces the uniformity in spacing between the optical film and an adjacent smooth surface.

The roughened surface can also optionally reduce or eliminate the need for a liner to protect the film prior to usage., because minor scratches are no longer visible. Furthermore, the roughened surface can often hide the presence of defects (e.g., gels, die deposits, dents, die lines, or scratches) that do not substantially affect the optical functioning of the optical film, but which would be visible on a smooth surface. The roughened surface can also optionally improve abrasion resistance of the film and can reduce any tendency of the film to warp as a result of temperature changes due to the lower coefficient of friction between the film and a smooth substrate such as the glass in an LC module. The roughened surface can in some cases resist or mask imprintation by surface features of adjacent films, substrates, and other items.

The roughening the surface of an optical film can also improve caliper control of the film as compared to films, that are embossed. This can result in better color uniforiity across the film.

Roughening of the film can substantially decrease the coefficient of friction of the surface of the film. The coefficient of friction (determined by, for example, ASTM D1894) of an optical film with a particle-containing surface layer can be 50% or less, 25% or less, or even 10% or less than the coefficient of friction of an optical film without a particle-containing surface layer. The use of a particle-containing layer can increase the average surface roughness by a factor of 3 or more, 10 or more, or even 25 or more. Average surface roughness can be determined using, for example, a Wyko interferometer (Wyko Corporation, Tuscon Ariz., Roughness/Step Tester model RS104048).

To roughen the surface layer(s) of the optical film, particles can be chosen that have a same or different index of refraction than the remainder of the material of the surface layer. Preferably, particles are chosen that can substantially retain their shape during normal usage of the optical film, thereby retaining the benefits of the roughening. Particles can be added to one or both of the skin layers of a reflective polarizing layer or a coating containing particles can be coated over one or both surfaces of the reflective polarizing layer. The surface texture of the surface layer(s) is affected by the shape and size distribution of the particles, the orientation conditions, the polymer(s) used to form the surface layer(s), and the extrusion or coating conditions.

Particles in a particle-containing layers can also act as diffusing elements (e.g., scattering elements), as illustrated in FIG. 2. These particle-containing layers can be positioned on a surface of or within a reflective polarizing element and can be formed with the reflective polarizing element or by coating the reflective polarizing element with an additional layer or layers.

When used for their diffusing/scattering properties, particles can be disposed within the particle-containing layer, projecting out of the surface of the layer, or both. The diffusion/scattering properties of the particle-containing film can result from bulk diffusion, surface diffusion, or a combination of both. When used for their diffusing properties and disposed in a skin layer, particles are preferably provided in a skin layer on only a single major surface of an optical film. Having particles in layers on both major surfaces of the optical film may permit transmission of light having the polarization that would otherwise be reflected, as described in commonly assigned U.S. patent application Ser. No. 09/199602, entitled Multilayer Reflector with Selective Transmission, incorporated herein by reference.

Color can arise in an optical device incorporating a reflective polarizer due to non-uniform transmission of light through the reflective polarizer over a range of wavelengths (non-uniform transmission spectra). In addition, the transmission spectra of a reflective polarizer can vary spatially so that different colors are observed in the display even when viewed at the same angle. The transmission spectra shifts as view angles are changed. The net effect can result in a complex pattern of colors that changes by view angle and screen position.

Particles in a particle-containing layer can scatter light traveling through the reflective polarizing element to produce an optical film with less color non-uniformity and less overall color (e.g., a color-hiding film), if desired. By scattering the light after the light has at least partially, and preferably completely, traveled through the reflective polarizing element, an observer looking at the film at a particular angle sees not only light that traveled through the reflective polarizing element at a single angle without scattering, but also, due to the scattering, light that traveled through the reflective polarizing element at other angles. The viewed spectra is one that has been averaged over a range of angles and is smoother (providing less color) than it would be with no diffusion. Thus, the spectrum seen by the observer is a combination of spectra for light traveling at different angles through the reflective polarizing element. This results in hiding the color that would otherwise be visible due to the particular pass spectrum at the angle of the observer.

The difference in the indices of refraction of the particles and the particle-containing layer can influence factors such as, for example, the normal angle gain (a measure of the amount of increased brightness obtained using the optical film in a backlit display configuration) of the optical film and the amount of color averaging obtained by scattering. Generally, normal angle gain decreases with increased difference between the indices of refraction of the particles and the particle-containing layer. In contrast, the amount of color averaging increases with increased difference between the indices of refraction of the particles and the particle-containing layer because larger index differences lead to higher scattering. Thus, the particles and the materials of the particle-containing layer can be selected, based at least in part on their indices of refraction, to achieve a desired balance of these properties. Typically, the index difference between the particles and the particle-containing layer is in the range of, for example, 0 to 0.12.

To obtain diffusing (e.g., scattering) effects, the particles can have an index of refraction different than the index of refraction of the remainder of the particle-containing layer (bulk diffusion). Alternatively, the index of the particles can be matched to the index of refraction of the remainder of the particle-containing layer, in which case the rough surface alone supplies the required diffusion (surface diffusion). The bulk diffusing (e.g., scattering) properties of the particle-containing layer(s) depend on a variety of factors including, for example, the index of particles, the index of the other portions of the particle-containing layer, the shape and orientation of the particles, and the density of the particles in the layer. The surface diffusing properties of the particle-containing layer(s) depend on a variety of factors including, for example, the shape and size distribution of the particles, the orientation conditions, the polymer(s) used to form the surface layer(s), and the extrusion or coating conditions. The diffusing properties of a film are a result of bulk diffusion, surface diffusion, or both bulk and surface diffusion.

In some instances, it may be preferred that the particles 132 have an index of refraction that is substantially similar to the index of refraction of the layer 104 such that diffusion of light passing through the article is primarily surface diffusion as opposed to bulk diffusion. For example, the index difference between the particles 132 and layer 104 can be about 0.2 or less, preferably about 0.1 or less, and more preferably about 0.05 or less. When surface diffusion is a preferred characteristic, the particles 132 are preferably optically clear for light in the wavelengths of interest.

When brightness enhancement films, such as BEF films available from 3M, St. Paul, Minn. are used in a liquid crystal display as the view angle is increased there is typically a sharp drop in intensity over a narrow angle range. The particles can smooth out this high angle cut-off and make this a more gradual transition. Additionally, when non-smooth films such as BEF are in close contact with the reflective polarizer film, they can imprint an undesirable pattern on the reflective polarizer film. The particles can reduce or eliminate visible surface imprinting on the polarizer film.

The optical film can also be used with an absorbing polarizer or with an absorbing polarizer layer, as described, for example, in WO 95/17691, WO 99/36813, and WO 99/36814, all of which are herein incorporated by reference. In this embodiment, the particle-containing layer can hide color as described above. The severity of the dark-state color leakage of conventional reflective/absorbing polarizers can be observed using a conventional dichroic polarizer oriented to absorb light of the polarization that is preferentially transmitted by the reflective/absorbing polarizer. The addition of a particle-containing layer typically reduces this color leakage.

Suitable materials for the particles include, for example, inorganic oxides and polymers that are substantially immiscible and do not cause delterious reactions (degradation) in the material of the layer during processing of the particle-containing layers, are not thermally degraded at the processing temperatures, and do not substantially absorb light in the wavelength or wavelength range of interest. Examples of suitable materials include silica, sodium aluminosilicate, alumina, liquid crystal polymers (e.g., Vectram™ liquid crystal polymer from Eastman Chemical Products, Inc., Kingsport, Tenn.), amorphous polystyrene, glass, styrene acrylonitrile copolymer, talc, cross-linked polystyrene particles or polystyrene copolymers, and alloys of alumina and silica (e.g., Zeeospheres™, 3M, St. Paul, Minn.), or combinations of these materials.

The particles generally have an average dimension in the range of, for example, 0.1 to 20 $\mu$m. Typically, the particles have an average dimension in the range of 0.3 to 10 $\mu$m. In at least some instances, small particles are preferred because this permits the addition of more particles per unit volume, often providing a rougher or more uniformly rough surface or more light diffusion centers.

Although particles with any shape can be used, spherical particles are preferred in some instances, particularly for maximizing color hiding and gain. For surface diffusion, spherical particles give a large amount of surface relief per particle compared to other shapes, as non-spherical particles tend to align in the plane of the film so that the shortest principle axis of the particles is in the thickness direction of the film.

The amount of particles in the particle-containing layer typically depends on factors such as, for example, the desired properties of the optical film, the type and composition of the polymer used for the particle-containing layer, the type and composition of the particles, and the index difference between the particles and the other materials (e.g., polymer(s)) of the particle-containing layer. The particles can be provided in the particle-containing layer in amounts of, for example, at least 0.01 vol. %, based on the total volume of the material used to make the particle-containing layer. Smaller amounts may not have a significant effect on film properties. For organic particles, particularly polymeric particles, the amount of particles is typically not greater than about 25 vol. %. Typically, for inorganic particles, the amount ranges from about 0.01 to 10 vol. % and often from 0.05 to 5 vol. %, based on the total volume of the material used to make the particle-containing layer.

The particles can be added to the particle-containing layer or layers using a variety of methods. For example, the particles can be combined with the polymer of the particle-containing layer in an extruder. The particle-containing layer(s) can then be coextruded with the optical layers to form the optical film. Alternatively, the particles can be combined with the polymer of the particle-containing layer in other ways including, for example, mixing the particles and polymer in a mixer or other device prior to extrusion.

In another method, the particles can be added to the monomers used to form the polymer of the particle-containing layer. For example, with polyester particle-containing layers, the particles might be added in the reaction mixture containing the carboxylate and glycol monomers used to form the polyester. Preferably, the particles do not affect the polymerization process or rate by, for example, catalyzing degradation reactions, chain termination, or reacting with the monomers. Zeeospheres™ are one example of a suitable particle for addition to monomers used to form polyester particle-containing layers. Preferably, the particles do not include acidic groups or phosphorus if they are combined with the monomers used to make the polyester.

In some instances, a masterbatch is prepared from particles and polymer using any of the methods described above. This masterbatch can then be added, in selected proportions, to additional polymer in an extruder or mixer to prepare a film with a desired amount of particles.

In another method of providing a surface layer including particles on a reflective polarizer, a surface layer precursor can be deposited on a previously formed reflective polarizing element. The surface layer precursor can be any material suitable for forming a coating on the reflective polarizing element, including monomer, oligomer, and polymer materials. For example, the surface layer precursor can be any of the polymer described above for use in the first and second optical layer and the non-optical layers or precursors of those polymers, as well as materials such as sulfopolyurethanes, sulfopolyesters, fluoroacrylates, and acrylates.

The particles can be provided in a premixed slurry, solution, or dispersion with the surface layer precursor. As an alternative, the particles can be provided separately from the surface layer precursor. For example, if the precursor is coated on the reflective polarizing element first, the particles can be deposited on the precursor, e.g., by dropping, sprinkling, cascading, or otherwise disposed, to achieve a desired monolayer or other distribution of the particles in and/or on the surface layer. The precursor can then be cured, dried or otherwise processed to form the desired surface layer that retains the particles in a manner as desired. The relative proportions of the surface layer precursor and the particles can vary based on a variety of factors including, for example, the desired morphology of the resulting roughened surface layer and the nature of the precursor.

In at least some embodiments, during the tentering process used to make oriented multilayer reflective polarizing films, a portion (e.g., 30%) of the total polymer used to make the film is held in the tenter clips and does not become fully oriented. This unoriented material can be trimmed off as "tenter edge trim". This "tenter edge trim" may contain particles of polymeric material. These particles can be generated, for example, by contamination from the tenter clips and/or post tenter processing.

Incorporation of particles into the skin layers or other particle-containing non-optical layers of optical films can mask particles that might be introduced when using recycled "tenter edge trim" or other recycled material. The rough surface and light scattering of the particles can hide the appearance of particles introduced by contamination or post tenter processing of the tenter edge trim. Thus incorporation of particles into these skin layers can better enable recycling of "tenter edge trim" and scrap reject film which can create significant cost savings and more efficient use of material.

Optional Cover Layer

Figure 14:
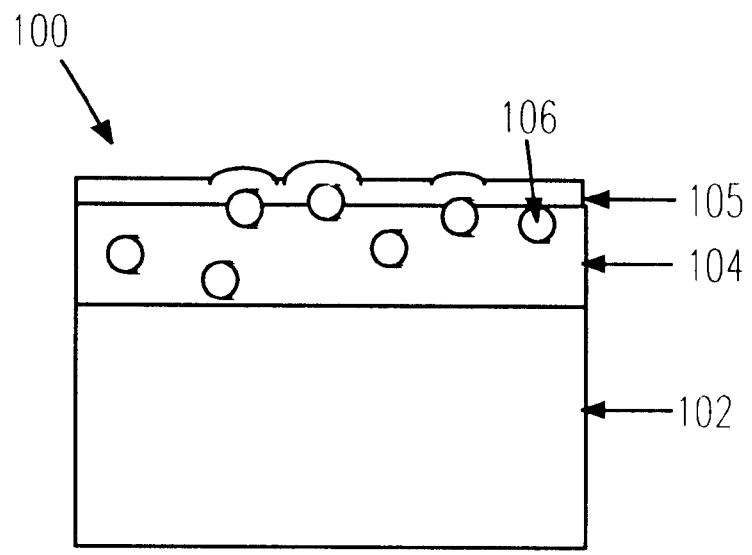
FIG. 14 is a schematic cross-sectional view of a ninth embodiment of an optical film according to the invention.

In at least some instances, the extrusion of a film with a particle-containing skin layer can result in build-up of the particle-containing material on the lip of the extrusion die. Occasionally, this material sloughs off of the die and can produce defects in the film. It is found that the die build up, and consequent film defects, can be reduced or eliminated by forming a cover layer 105 (or layers) over the particle-containing skin layer 104 of an optical film 100, as illustrated in FIG. 14. Typically, the thickness and materials of the cover layer are selected so upon orientation (e.g., stretching) the cover layer has a roughened surface due to the presence of the particles in the particle-containing layer.

Prior to orientation, the cover layer may or may not have a roughened surface.

The cover layer can be used in conjunction with any of the particle-containing skin layers illustrated in FIGS. 1, 2, 3, 5, 6, and 7 or any of those described above. The particle-containing skin layer and cover layer can function together as a "surface layer" to provide any of the advantages or properties described above. Suitable materials include those polymeric materials described for use in forming the skin layer(s), including, for example, polyesters (e.g., copolyesters of polyethylene naphthalate and polyethylene terephthalate). In some embodiments, the cover layer is formed using the same polymer at least one of the first optical layers, second optical layers, or skin layers.

The use of a cover layer can reduce the surface roughness (e.g., $R_q$) of the optical film (relative to the same film without the cover layer), but that surface roughness is still typically greater than the surface roughness of a similar optical film formed without a particle-containing skin layer.

Other Layers and Coatings

Various functional layers or coatings may be added to the films and optical devices of the present invention to alter or improve their physical or chemical properties, particularly along the surface of the film or device. If the particle-containing layer is used to roughen a surface of the optical film, the additional layers and coatings are not typically provided over the particle-containing layer unless the layer or coating is also roughened. Suitable layers or coatings may include, for example, low adhesion backside materials, conductive layers, antistatic coatings or films, barrier layers, flame retardants, UV stabilizers, abrasion resistant materials, optical coatings, and substrates designed to improve the mechanical integrity or strength of the film or device. Additional layers or coatings are described, for example, in WO 97/01440, WO 99/36262, and WO 99/36248, all of which are herein incorporated by reference.

Display Examples

Figure 8:
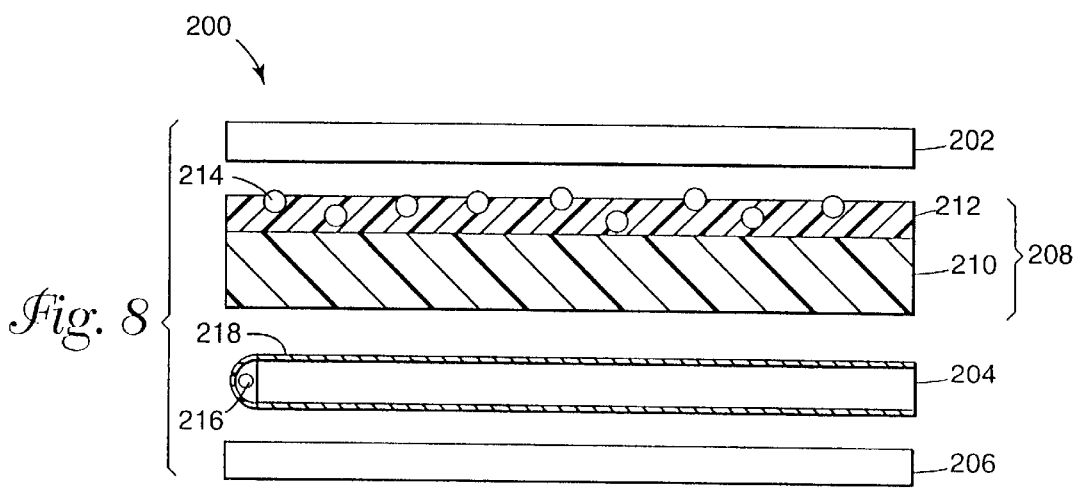
FIG. 8 is a schematic cross-sectional view of one embodiment of a backlit display according to the invention.

The optical films can be used in a variety of display systems and other applications, including transmissive (e.g., backlit), reflective, and transflective displays. For example, FIG. 8 illustrates a cross-sectional view of one illustrative backlit display system 200 according to the present invention including a display medium 202, a backlight 204, a polarizer 208, and an optional reflector 206. A viewer is located on the side of the display device 202 that is opposite from the backlight 204.

The display medium 202 displays information or images to the viewer by transmitting light that is emitted from the backlight 204. One example of a display medium 202 is a liquid crystal display (LCD) that transmits only light of one polarization state. Because an LCD display medium is polarization-sensitive, it may be preferred that the backlight 204 supply light with a polarization state that is transmitted by the display device 202.

The backlight 204 that supplies the light used to view the display system 200 includes a light source 216 and a light guide 218. Although the light guide 218 depicted in FIG. 8 has a generally rectangular cross-section, backlights can use light guides with any suitable shape. For example, the light guide 218 can be wedge-shaped, channeled, a pseudo-wedge guide, etc. The primary consideration is that the light guide 218 be capable of receiving light from the light source 216 and emitting that light. As a result, the light 218 can include back reflectors (e.g., optional reflector 206), extraction mechanisms and other components to achieve the desired functions.

The reflective polarizer 208 is an optical film that includes a reflective polarizing element 210 and at least one layer 212 containing particles 214. The reflective polarizer 208 is provided as a part of the backlight to substantially transmit light of one polarization state exiting the light guide 218 and substantially reflect light of a different polarization state exiting the light guide 218. The reflective polarizing element 208 can be, for example, a multilayer reflective polarizer, a continuous/disperse phase reflective polarizer, a cholesteric reflective polarizer, or a wire grid reflective polarizer. Although the particle-containing layer 212 is illustrated as being on the reflective polarizing element, the particle containing layer(s) can be disposed, for example, on or within the reflective polarizing element, as described above.

In one embodiment, the particle-containing layer 212 is utilized for its diffusive (e.g., scattering) properties. In this embodiment, the particle-containing layer is preferably a skin layer or coating on a surface of the reflective polarizing element 210 opposite the surface that receives light from the backlight 204.

EXAMPLES

Materials utilized in creating polymers for these examples are commercially available from the following suppliers: dimethyl naphthalene dicarboxylate and terephthalic acid from Amoco (Decatur, Ala.), dimethyl terephthalate from Hoechst Celanese (Dallas, Tex.), and ethylene glycol from Union Carbide (Charleston, W. Va.), and 1,6-hexanediol from BASF (Charlotte, N.C.).

A "gain tester" was used to test several of the films in the Examples. The "gain tester" can be fabricated using a spot photometer and a suitable backlight with a polarizer placed between the two so that only one polarization of light from the backlight is measured by the photometer. Suitable spot photometers include the Minolta LS-100 and LS-110 (Minolta Co., Ltd., Ramsey, N.J.). The absolute value of a measured gain depends on the backlight used and on the orientation of the sample on the backlight, as well as the size of the sample. Gain is defined as the normal axis luminous brightness of the tester with the reflective polarizer in the light path normalized by the normal axis luminous brightness without the reflective polarizer in the light path. The backlight used in the Examples was obtained from Landmark and the polarizer was a high contrast display polarizer which was oriented so that the pass axis of the polarizer was aligned with the long axis of the backlight. The sample was inserted into the tester so that the pass axis of the sample was aligned with the pass axis of the high contrast polarizer. The sample was made large enough to cover the entire backlight.

Newton's Rings were measured by placing the side of the film with the particle-containing surface layer against a clean piece of smooth glass on top of a monochromatic green (about 540 nm) diffuse backlight source. After smoothing the film down onto the glass by hand, Newton's rings are made visible (if present) as light and dark fringes. The results are judged on a scale of 1 (no Newton's Rings visible) to 4 (heavy Newton's Rings).

Wet-Out was measured similar to Newton's rings except that a white light source was used. Wet-Out was indicated by the presence of bright spots where the reflective polarizer is coupled to the glass. The results are provided on a scale of 1 (no wetting observed) to 4 (heavy wetting).

The average roughness, $R_q$, was measured using a Wyko interferometer (Wyko Corporation, Tuscon Ariz., Roughness/Step Tester model RS104048,) at 100× magnification.

The coefficient of friction was measured against polyethylene terephthalate film according to ASTM No. D1894.

Blockiness is a subjective measure describing the quality of roll formation using the polarizer film. Bad roll formation is an indication of defects, such as cross-buckling, pimples, and wrinkles in the film. In general, if the coefficient of friction between the adjacent film surfaces in a roll is low enough, there are few, if any, roll formation defects.

Comparative Examples 1 and 2 and Examples 1–23

Multilayer reflective polarizer films were constructed with first optical layers created from a co(polyethylene naphthalate) with carboxylate subunits derived from 90 mol % dimethyl naphthalene dicarboxylate and 10 mol % dimethyl terephthalate, and glycol subunits derived from 100 mol % ethylene glycol subunits and an intrinsic viscosity of 0.48 dL/g. The index of refraction was about 1.633.

The second optical layers were created from a co(polyethylene naphthalate) with carboxylate subunits derived from 55 mol % dimethyl naphthalene dicarboxylate and 45 mol % dimethyl terephthalate, and glycol subunits derived from 95 mol % ethylene glycol and 5 mol % hexanediol and an intrinsic viscosity of 0.53 dL/g. The index of refraction was about 1.610.

Skin layers were formed using the same polyester as the second optical layers. Except for the Comparative Examples and Example 12, one of the skin layers included, as particles, amorphous polystyrene (Styron 663, Dow Chemical Corp., Midland, Mich., index of refraction: 1.59), W-210 Zeeospheres (3M Co., St. Paul, Minn., index of refraction: 1.53, average particle size: 2.5 μm, particles larger than 5 μm have been removed), silica (Aerosil™ Ox50, Dugussa Corp., Dublin, Ohio, index of refraction: 1.48, average particle size: 0.3 μm), or a combination of these materials in the amounts listed in Table 1. During optical testing, this single skin layer containing particles was oriented on the upper surface of the optical film so that light from the backlight passed through the remainder of the optical film before passing through the particle-containing optical layer. Comparative Examples 1 and 2 did not include particles in a skin layer. Example 12 included particles in both skin layers on opposing sides of the stack of first and second optical layers.

TABLE 1

Composition and Results for Comparative Examples 1 and 2 and Examples 1–23

| Example | Polystyrene (wt. %) | Zeeospheres (wt. %) | Gain | Newton's Rings | Wet-out | Coeff. Of Friction | $R_q$ (nm) | Blockiness |
|---|---|---|---|---|---|---|---|---|
| Comp. 1 | — | — | 1.538 | 4 | 4 | <5 | 15 | — |
| 1 | 20.00 | — | 1.524 | 1 | 1 | 0.4 | 428 | — |
| 2 | 10.00 | — | 1.530 | 1 | 1 | 0.4 | 219 | — |
| 3 | 5.00 | — | 1.534 | 1 | 1 | 0.7 | 157 | — |
| 4 | 2.50 | — | 1.536 | 1 | 1 | 1.15 | 88 | — |
| 5 | 1.25 | — | 1.536 | — | — | — | 54 | — |
| 6 | — | 0.15 | 1.541 | 3 | 1 | 0.35 | 47 | — |
| 7 | — | 0.30 | 1.540 | 2 | 1 | 0.33 | 71 | — |
| 8 | — | 0.60 | 1.538 | 2 | 1 | 0.3 | 97 | — |
| 9 | — | 1.20 | 1.531 | 2 | 1 | — | 132 | — |
| 10 | — | 3.00 | 1.511 | 1 | 1 | 0.35 | 232 | — |
| 11 | 2.50 | 0.30 | 1.540 | 1 | 1 | 0.3 | 106 | — |
| 12 | 5[a] | — | 1.526 | — | — | 0.7 | 211 | — |
| Comp. 2 | — | — | 1.554 | 4 | 3 | — | — | Poor |
| 13 | 2.50 | — | 1.548 | 2 | 1 | — | — | Fair |
| 14 | 3.75 | — | 1.551 | 2 | 1 | — | — | Fair |
| 15 | 5.00 | — | 1.551 | 1 | 1 | — | — | Fair |
| 16 | 5.00 | 0.15 | 1.546 | 1 | 1 | — | — | Excellent |
| 17 | 3.75 | 0.15 | 1.550 | 1 | 1 | — | — | Excellent |
| 18 | 2.50 | 0.15 | 1.552 | 2 | 1 | — | — | Excellent |
| 19 | 3.75 | — | 1.545 | 2 | 1 | 0.15 | — | Fair |
| 20 | 3.75 | — | 1.551 | 1 | 1 | 0.30 | — | Excellent |
| 21 | — | 1.00 | 1.551 | 3 | 1 | — | — | Excellent |
| 22 | — | 2.00 | 1.552 | 2 | 1 | — | — | Excellent |
| 23 | — | 3.00 | 1.542 | 1 | 1 | — | — | Excellent |

[a]Particles provided in both skin layers at this percentage.

The above described coPEN's were coextruded using a feedblock/multiplier system to create a multilayer film with 892 alternating first and second optical layers and a skin layer on each surface of the alternating first and second optical layers. The individual first and second optical layers range in thickness from about 50 nm to 120 nm, while both skin layers were about 12 μm thick. The cast film was heated in an tenter charged with hot air set at 154° C. for about 20 seconds and then uniaxially oriented at a 6:1 draw ratio to produce a reflective polarizer approximately 125 μm thick.

Table 1 indicates the normal angle gain, Newton's Rings, wet-out, coefficient of friction, and blockiness for these Examples. Typically, a small amount of particles was needed to eliminate wet out, but more was needed to eliminate Newton's Rings. Other tests, including cross-web caliper and interply delamination appeared to be unaffected by the presence of particles in the skin layer(s). Gain of the optical films with a particle-containing skin layer was typically not substantially reduced when compared to the optical films of the Comparative Examples.

In particular, the samples with Zeeospheres™ gave a uniform isotropic appearance. The polystyrene samples had a grain in the transverse direction with a length of about 1 mm in the transverse direction and about 50 μm in the stretch direction.

Comparative Examples 3 and 4 and Examples 24–26

Multilayer reflective polarizer films were constructed in the same manner as described in the previous examples, except that the first optical layers were made of polyethylene naphthalate (PEN) and the amount and type of particles used in the polarizers of Examples 24–26 and the thickness of the skin layers was varied as shown in Table 2.

TABLE 2

Composition and Results for Comparative Examples 3 and 4 and Examples 24–26

| Example | Particles | Vol. % of Particles | Total Polarizer Thickness (μm) | Skin Layer Thickness (μm) | Normal angle gain | Std. Deviation of p-polarized pass state from 400–650 nm |
|---|---|---|---|---|---|---|
| Comp. 3 | — | 0.0 | 12.5 | 125 | 1.580 | 8.4% |
| 24 | Zeeo-spheres | 2.5 | 12.5 | 125 | 1.578 | 6.2% |
| Comp. 4 | — | 0.0 | 25 | 125 | 1.555 | 8.3% |
| 25 | Zeeo-spheres | 5.0 | 25 | 125 | 1.569 | 4.3% |
| 26 | PS/EM[b] | 10.0 | 25 | 125 | 1.570 | 3.2% |

[b]Solid spherical particles of a copolymer of polystyrene and ethyl acetate (index 1.53, avg. diameter 2.5 μm.)

Examples 24, 25, and 26 exhibited substantial color hiding in an LC display. The standard deviation of the p-plolarized pass state from 400 to 650 nm was determined using a light source directed at an angle of 60 degrees toward the surface of the optical film formed by the particle-containing skin layer (for Examples 24–26). Light transmitted through the film was observed using a Lambda 19 spectrophotometer fitted with an integrating sphere (Perkin Elmer Corp., Norwalk, Conn.). This experimental set-up is optically analogous to a backlit display, such as that illustrated in FIG. 8, observed by a viewer at an angle of 60 degrees to the plane of the optical film.

Figure 9:
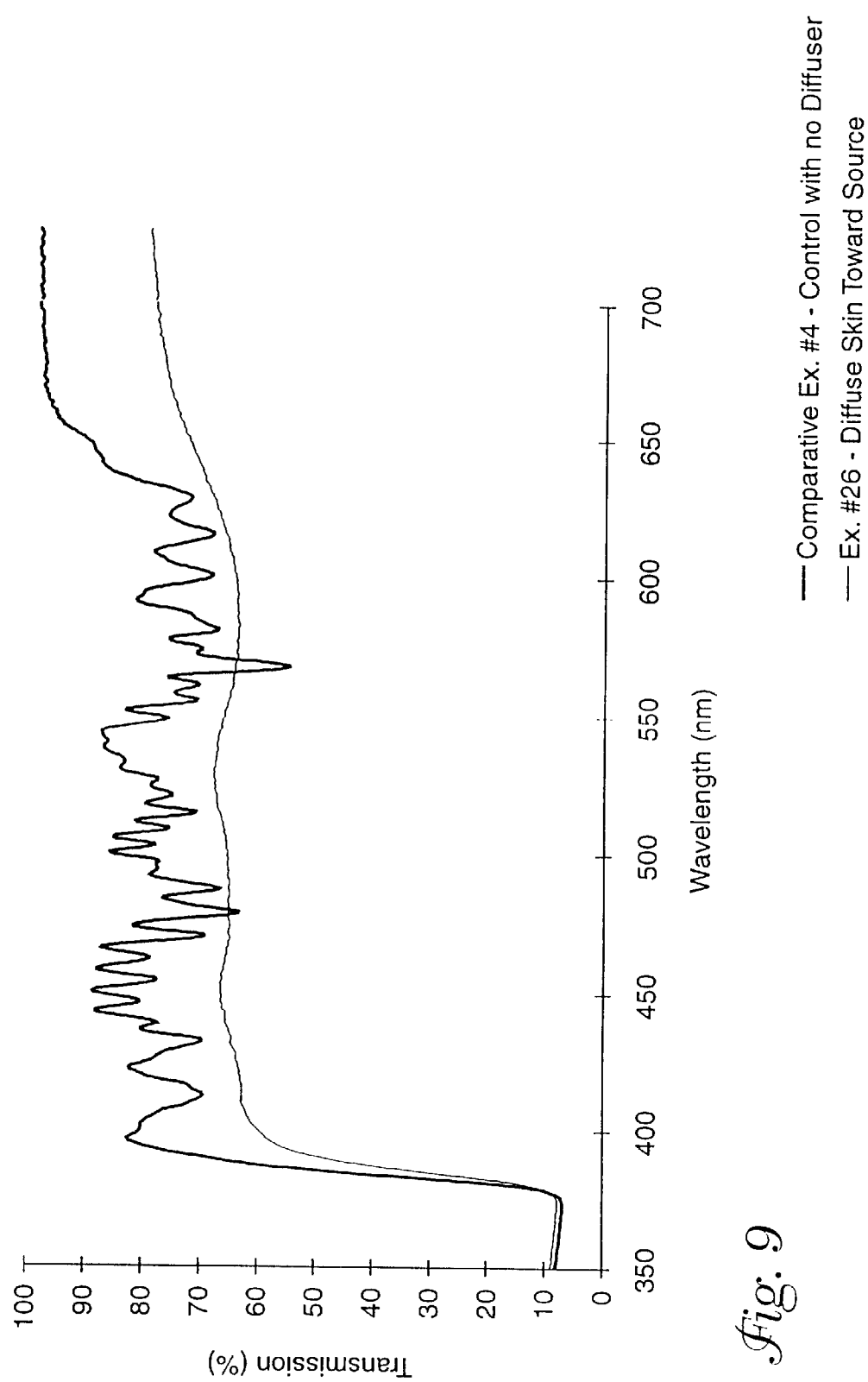
FIG. 9 is a graph of spectra observed using an optical film without a particle-containing skin layer (dark line) and an optical film having a particle-containing skin layer (light line)

FIG. 9 includes spectra for the optical films of Comparative Example 4 (dark line) and Example 26 (light line). The optical film of Example 26 has a much more uniform spectrum over the wavelength range of 400 to 650 nm.

Example 27

A multilayer reflective polarizer film similar to the multilayer reflective polarizer films of Comparative Examples 1 and 2 was coated with a surface layer including polystyrene beads with a nominal diameter of 4 microns in a sulfopolyurethane resin matrix. The polystyrene beads were premixed to form a surface layer precursor of (by weight) 69% H₂O, 20% sulfopolyurethane resin made according to U.S. Pat. Nos. 5,756,633 and 5,929,160, 1% Triton X-100 (Union Carbide Chem. and Plastics Co., Danbury, Conn.), and 10% polystyrene beads. The refractive indices of the polystyrene beads and the sulfopolyurethane resin each lie in the range of 1.51 to 1.56.

The precursor was hand-spread on the reflective polarizing film. The water was evaporated off to form a finished surface layer including a roughened surface, leaving the polystyrene beads partially embedded in the resin matrix.

Observation showed a monolayer distribution of the beads at the surface of the surface layer, with the exposed beads occupying less than 100% of the surface of the surface layer.

Figure 12:
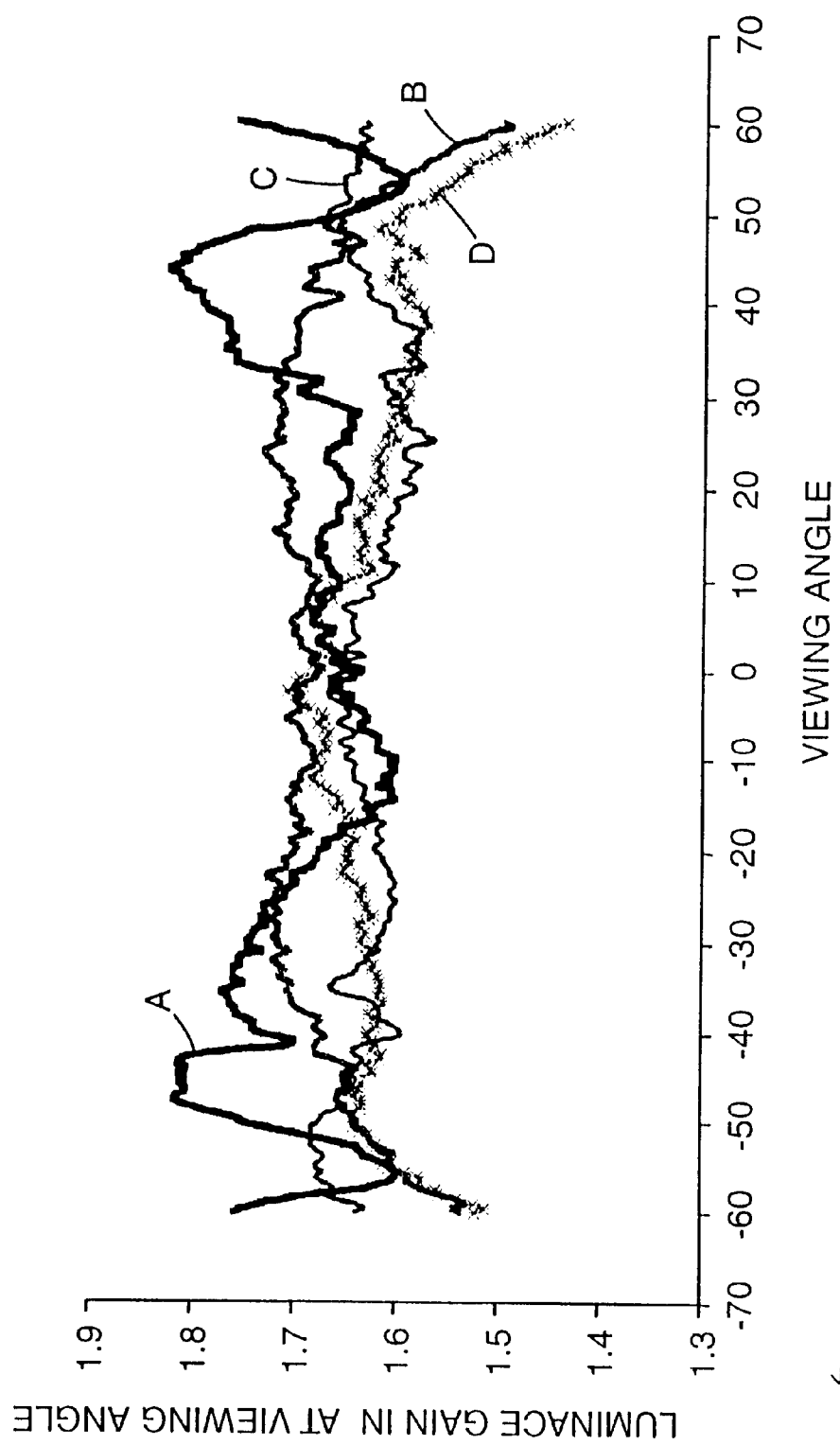
FIG. 12 is a graph illustrating luminance gain with viewing angle for multilayer reflective polarizers with and without particle-containing coatings.

Referring to FIG. 12, optical performance in the terms of luminance gain is depicted as compared to the same multilayer reflective polarizing film without the surface layer. These results were obtained using the gain tester described above. Lines A and B illustrate the luminance gain over a range of viewing angles for a multilayer reflective polarizer film without a particle-containing surface layer using a second polarizer at 0 degrees and 90 degrees, respectively. Lines C and D illustrate the luminance gain over a range of viewing angles for a multilayer reflective polarizer film with a particle-containing surface layer using a second polarizer at 0 degrees and 90 degrees, respectively. As illustrated, the surface layer increased luminance gain for viewing angles from normal to about ±30 degrees, including a 2–3 point gain increase at normal angle.

Example 28

A surface layer according to Example 27 was formed on a continuous/diffuse phase reflective polarizing element. A three-layer film was produced by coextrusion and oriented. The outer layers included 52 wt. % coPEN (a copolymer having 70 mol % naphthalate and 30 mol % terephthalate carboxylate subunits and 100 mol % glycol subunits derived from ethylene glycol), 45 wt. % syndiotactic polystyrene copolymer (Questra™ MA405, Dow Chemical Co., Midland, Mich.,), and 3 wt. % styrene maleic anhydride copolymer (Dylark™ 332, Nova Chemicals, Inc., Monacha, Pa.). The central layer was a copolyester with 80 mol % terephthalate and 20 mol % isophthalate carboxylate subunits and 100 mol % glycol subunits derived from ethylene glycol. The thickness of the layers was approximately equal.

The layers were coextruded onto a chilled casting wheel using a feedblock and a drop die to form a web. The cast sheet was oriented in the machine direction to a draw ratio of about 1.25:1 using a length orienter. The sheet was oriented in the transverse direction at a draw ratio of about 1:4.9 using a tenter. The thickness of the oriented film was about 170 micrometers.

Observation showed a monolayer distribution of the beads at the surface of the surface layer, with the exposed beads occupying less than 100% of the surface of the surface layer.

Figure 13:
FIG. 13 is a graph illustrating luminance gain with viewing angle for continuous/diffuse phase reflective polarizers with and without particle-containing coatings.

Referring to FIG. 13, optical performance in the terms of luminance gain is depicted as compared to the same diffuse reflective polarizing film without the surface layer. These results were obtained using the gain tester described above. Lines A and B illustrate the luminance gain over a range of viewing angles for a continuous/diffuse phase reflective polarizer film without a particle-containing surface layer using a second polarizer at 0 degrees and 90 degrees, respectively. Lines C and D illustrate the luminance gain over a range of viewing angles fer a continuous/diffuse phase reflective polarizer film with a particle-containing surface layer using a second polarizer at 0 degrees and 90 degrees, respectively. As illustrated, use of the optical film preserves normal incidence luminance gain and illustrates how the optical film can better manage light output for a display.

Comparative Example 5 and Examples 29 and 30

Multilayer reflective polarizer films were constructed with first optical layers created from polyethylene naphthalate with an intrinsic viscosity of 0.48 dL/g. The second optical layers were created from a co(polyethylene naphthalate) with carboxylate subunits derived from 55 mol % dimethyl naphthalene dicarboxylate and 45 mol % dimethyl terephthalate, and glycol subunits derived from 95 mol % ethylene glycol and 5 mol % hexanediol and an intrinsic viscosity of 0.53 dL/g. Each of the first and second layers were about 50 to 120 nm thick.

A first skin layer was formed on the side of the film that comes in contact with a casting wheel using a co(polyethylene naphthalate) with carboxylate subunits derived from 75 mol % dimethyl naphthalene dicarboxylate and 25 mol % dimethyl terephthalate, and glycol subunits derived from 95 mol % ethylene glycol and 5 mol % hexanediol and an intrinsic viscosity of 0.53 dL/g. A second skin layer was formed on the opposing side of the film using the same polyester as the second optical layers. Except for Comparative Example 5, the second skin layer included, as particles, W-210 Zeeospheres (3M Co., St. Paul, Minn., index of refraction: 1.53, average particle size: 2.5 μm, particles larger than 5 μm have been removed). The skin layers were about 12 μm thick.

For Example 30, a coating film made from the same material as the first skin layer was formed over the particle-containing second skin layer. The coating film was about 6.8 μm thick before orientation

| Example | Particles in Skin Layer | Thickness of Cover layer before Orientation (micrometers) | Roughness of Oriented film ($R_q$) (nm) |
|---|---|---|---|
| Comp. 5 | None | None | 17 |
| 29 | 5 wt. % Zeeospheres ™ | None | 516 |
| 30 | 5 wt. % Zeeospheres ™ | 6.8 | 317 |

The layers were coextruded onto a chilled casting wheel using a feedblock and a drop die to form a web to create a multilayer film with 892 alternating first and second optical layers with a skin layer on each surface of the stack of alternating first and second optical layers. For Examples 29 and 30, the skin layer on the casting wheel side of the film included the Zeeospheres™. In Example 30, a cover layer was formed over the particle-containing skin layer. After heating for about 20 seconds in a tenter charged with hot air set at about 154° C., the cast sheet was oriented at a draw ratio of about 6:1. The thickness of the oriented film was about 125 micrometers.

Newton's rings and wet-out were not observed for Examples 29 and 30. Cross-web caliper and interply delamination were unaffected by the presence of particles in one skin layer and the presence of a cover layer over the particle-containing skin layer. For the same orientation conditions the gain of the optical film with a cover layer over the particle-containing layer was not substatially reduced. For example, the gain for Comparative Example #5 was 1.548 while the gain for Example 30 was 1.541.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An optical film comprising:
 a reflective polarizing element substantially reflecting light having a first polarization state and substantially transmitting light having a second polarization state; and
 a surface layer disposed on the reflective polarizing element and in a same optical path as the reflective polarizing element, the surface layer being configured and arranged to transmit light, the surface layer compr sing a plurality of particles that roughen an exterior surface of the surface layer;
 wherein a gain advantage of an optical device utilizing the optical film is not reduced snore than about five percent when compared to a gain advantage of the optical device utilizing a salme optical film without the plurality of particles in the surface layer.

2. The optical film of claim 1, wherein at least some of the particles are partially embedded in the surface layer and partially projecting from the surface layer.

3. The optical film of claim 1, wherein substantially all of the plurality of particles are arranged in a monolayer at the exterior surface of the surface layer.

4. The optical film of claim 1, wherein substantially all of the plurality of particles are embedded in the surface layer.

5. The optical film of claim 1, wherein the particles and a remainder of the surface layer have indices of refraction that differ by no more than about 0.2.

6. The optical film of claim 1, wherein the particles are generally spherical.

7. The optical film of claim 1, wherein the reflective polarizing element and the surface layer are formed as a co-extruded film.

8. The optical film of claim 1, wherein the surface layer comprises a film coated on the reflective polarizing element.

9. The optical film of claim 1, wherein the reflective polarizing element comprises first and second materials, at least one of the first and second materials being birefringent, wherein a refractive index difference between the first and second materials for light having the first polarization is large enough to substantially reflect the light having the first polarization and a refractive index difference between the first and second materials for light having the second polarization is small enough to substantially transmit the light having the second polarization.

10. The optical film of claim 9, wherein the reflective polarizing element comprises a multilayer optical film having a plurality of birefringent first optical layers interleaved with a plurality of second optical layers.

11. The optical film of claim 9, wherein the first material is disposed in the second material.

12. The optical film of claim 1, wherein the reflective polarizing element comprises birefringent cholesteric material.

13. The optical film of claim 1, wherein the plurality of particles comprise at least one material selected from the group consisting of amorphous polymers, alumina, silica, alloys of alumina and silica, glass, talc, and combinations thereof.

14. The optical film of claim 1, wherein the optical film has a reduced tendency to form Newton's Rings when placed proximate another surface, as compared to a same optical film without the particles in the surface layer.

15. The optical film of claim 1, wherein the multilayer optical film has a reduced tendency to wet-out when placed proximate another surface, as compared to a same multilayer optical film without the particles in the surface layer.

16. The optical film of claim 1, wherein a gain advantage of an optical device utilizing the optical film is reduced by no more than 3% when compared to a gain advantage of the optical device utilizing a same optical film without the plurality of particles in the surface layer.

17. The optical film of claim 16, wherein the optical film is capable of transmitting visible light through the reflective polarizing element and then the surface layer with substantially more uniform intensity over a range of 400 to 650 nm than a same optical film without the plurality of particles.

18. An optical device comprising;
light source; and
the optical film of claim 1.

19. The optical device of claim 18, wherein the surface layer is disposed on a surface of the reflective polarizing element opposite a surface receiving light from the light source.

20. The optical device of claim 18, wherein the surface layer comprises a skin layer of the reflective polarizing element.

21. The optical device of claim 18, wherein the surface layer comprises a coating disposed on a surface of the reflective polarizing element.

22. The optical device of claim 18, wherein at least a portion of the plurality of particles project from the surface layer.

23. The optical device of claim 18, wherein the reflective polarizing element and the surface layer transmit visible light with substantially more uniform intensity over a range of 400 to 650 nm than a same reflective polarizing element and surface layer without the plurality of particles.

24. The optical device of claim 18, wherein the light source comprises a backlight.

25. The optical device of claim 18, further comprising a display medium.

26. The optical device of claim 25, wherein the display medium comprises a liquid crystal display medium.

27. The optical device of claim 25, wherein the reflective polarizing element and surface layer are disposed between the light source and the display medium.

28. The optical device of claim 27, wherein the surface layer is disposed between the reflective polarizing element and the display medium.

29. A method of making an optical film, comprising:
 forming a reflective polarizing element that substantially reflects light having a first polarization state and substantially transmits light having a second polarization state; and
 forming a surface layer on a first major surface of the reflective polarizing element, the surface layer comprising a plurality of particles that roughen an exterior surface of the surface layer, wherein a gain advantage of an optical device utilizing the optical film is not reduced by more than about five percent when compared to a gain advantage of the optical device utilizing a same optical film without the plurality of particles in the surface layer.

30. The method of claim 29, wherein forming a reflective polarizing element and forming a surface layer comprise coextruding the reflective polarizing element and the surface layer.

31. The method of claim 29, further comprising disposing at least one surface layer without particles on a second major surface of the reflective polarizing element.

32. The method of claim 29, wherein forming a surface layer comprises
 mixing a plurality of particles with monomers used to form a surface layer polymer;
 polymerizing the monomers to form the surface layer polymer in the presence of the plurality of particles; and
 forming the surface layer using at least a portion of the surface layer polymer and plurality of particles.

33. The method of claim 29, wherein forming the surface layer comprises depositing a surface layer polymer containing a plurality of particles on the reflective polarizing element.

34. The method of claim 29, wherein forming the surface layer comprises
 disposing a surface layer polymer on the reflective polarizing element; and
 disposing a plurality of particles in the surface layer polymer on the reflective polarizing element.

35. An optical film comprising:
 a reflective polarizing element substantially reflecting light having a first polarization state and substantially transmitting light having a second polarization state; and
 a particle-containing layer disposed on the reflective polarizing element and in a same optical path as the reflective polarizing element, the particle-containing layer being configured and arranged to transmit light, the particle-containing layer comprising a plurality of particles that roughen an exterior surface of the optical film;
 wherein a gain advantage of an optical device utilizing the optical film is not reduced by more than about five percent when compared to a gain advantage of the optical device utilizing a same optical film without the plurality of particles in the particle-containing layer.

36. The optical film of claim 35, further comprising a cover layer disposed over the particle-containing layer, wherein the plurality of particles in the particle-containing layer roughen an exterior surface of the cover layer.

37. The optical film of claim 35, wherein the reflective polarizing element comprises first and second materials, at least one of the first and second materials being birefringent, wherein a refractive index difference between the first and second materials for light having the first polarization is large enough to substantially reflect the light having the first polarization and a refractive index difference between the first and second materials for light having the second polarization is small enough to substantially transmit the light having the second polarization.

38. The optical film of claim 37, wherein the reflective polarizing element comprises a multilayer optical film having a plurality of birefringent first optical layers interleaved with a plurality of second optical layers.

39. The optical film of claim 37, wherein the first material is disposed in the second material.

40. The optical film of claim 35, wherein the reflective polarizing element comprises birefringent cholesteric material.

* * * * *

UNITED STATES PATENT AND TRADEMARK OFFICE
CERTIFICATE OF CORRECTION

PATENT NO. : 6,268,961 B1 Page 1 of 1
DATED : July 31, 2001
INVENTOR(S) : Timothy J. Nevitt et al.

It is certified that error appears in the above-identified patent and that said Letters Patent is hereby corrected as shown below:

Column 10,
Line 41, delete "usage.," and insert therefore -- usage, --
Line 56, delete "uniforiity" and insert therefore -- uniformity --.

Column 13,
Line 9, delete "Vectram ™" and insert therefore -- Vectra ™ --.

Column 18,
Table 1, Example Comp. 1, delete "<5" and insert therefore -- >5 --.

Column 20,
Line 46, delete "fer" and insert therefore -- for --.

Column 22,
Line 4, delete "snore" and insert therefore -- more --.
Line 6, delete "salme" and insert therefore -- same --.

Column 23,
Line 2, the phrase "light source" should read -- a light source --.

Signed and Sealed this

Thirteenth Day of August, 2002

Attest:

JAMES E. ROGAN
Attesting Officer      Director of the United States Patent and Trademark Office